United States Patent
Evans et al.

(10) Patent No.: US 9,672,306 B2
(45) Date of Patent: *Jun. 6, 2017

(54) PREPARING ENGINEERING CHANGE ORDERS FOR PHYSICAL DESIGN USING BOOLEAN EQUIVALENCE CHECKING TOOLS

(71) Applicant: International Business Machines Corporation, Armonk, NY (US)

(72) Inventors: Sean T. Evans, Rochester, MN (US); Thomas A. Haselhorst, Rochester, MN (US); Scott H. Mack, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/998,579

(22) Filed: Sep. 3, 2015

(65) Prior Publication Data

US 2017/0068754 A1 Mar. 9, 2017

Related U.S. Application Data

(63) Continuation of application No. 14/844,191, filed on Sep. 3, 2015.

(51) Int. Cl.
*G06F 17/50* (2006.01)
(52) U.S. Cl.
CPC ................. *G06F 17/505* (2013.01)
(58) Field of Classification Search
USPC ........................ 716/107, 133, 139
See application file for complete search history.

(56) References Cited

U.S. PATENT DOCUMENTS 6,453,454 B1 * 9/2002 Lee .................... G06F 17/5045
716/102
2004/0230920 A1  11/2004 Blinne et al.
(Continued)

FOREIGN PATENT DOCUMENTS

| WO | 96/37855 | 11/1996 |
| WO | 2006/012335 A2 | 2/2006 |
| WO | 2011/147075 A1 | 12/2011 |

OTHER PUBLICATIONS

Nelson, Kelvin et al., Physical-Design-Friendly Hierarchical Logic Built-In Self-Test—A Case Study, 13th International Symposium on Quality Electronic Design, Mar. 2012, pp. 1-6, IEEE, Piscataway, United States.

(Continued)

*Primary Examiner* — Brian Ngo
(74) *Attorney, Agent, or Firm* — Patterson + Sheridan, LLP (57) ABSTRACT

Embodiments herein describe performing an engineering change order (ECO) after a physical design team has begun (or finished) a physical design (PD) netlist. However, the ECO may describe changes or additions to the logic and/or nets using component names found in a design netlist that is different than the PD netlist. Embodiments herein rely on generating an equivalents nets file that the maps the components in the design netlist to the components in the PD netlist. When performing an ECO, the PD team can use this file to map the components in the ECO (which are based on the design netlist) to all the equivalent components in the PD netlist. The PD team then selects one of the equivalent components to alter as indicated in the ECO.

6 Claims, 7 Drawing Sheets

(56) References Cited

U.S. PATENT DOCUMENTS

2006/0271899 A1 11/2006 Tan et al.
2006/0282810 A1 12/2006 Dutt et al.
2009/0178015 A1 7/2009 Federovsky et al.
2012/0254818 A1 10/2012 Liu et al.

OTHER PUBLICATIONS

Zuchowski, Paul S. et al., A Hybrid ASIC and FPGA Architecture, Proceedings of the 2002 IEEE/ACM international conference on Computer-aided design, 2002, 8 pages, ACM, New York, United States.
List of IBM Patents or Patent Applications Treated as Related, dated Jan. 4, 2017.

* cited by examiner

| EQUIVALENT NETS FILE 500 ||
| --- | --- |
| DESIGN COMPONENT | PD ALTERNATIVE COMPONENT |
| NET A | NET A_1<br>NET A_2<br>NET A_3<br>NET A_4<br>NET A_5<br>NET A_6 |
| NET B | NET B_1<br>NET B_2<br>NET B_3<br>NET B_4 |

PREPARING ENGINEERING CHANGE ORDERS FOR PHYSICAL DESIGN USING BOOLEAN EQUIVALENCE CHECKING TOOLS

CROSS-REFERENCE TO RELATED APPLICATIONS

This application is a continuation of co-pending U.S. patent application Ser. No. 14/844,191, filed Sep. 3, 2015. The aforementioned related patent application is herein incorporated by reference in its entirety.

BACKGROUND

The present invention relates to performing a change order during, or after, a chip is designed, and more specifically, to using a Boolean equivalence checking tool to perform the change order.

In chip design, an engineering change order is the process of inserting a logic change directly into the netlist after it has already been processed by an automatic layout tool. Before the chip masks are made, engineering change orders (ECOs) are usually done to save time, by avoiding the need for full ASIC logic synthesis, technology mapping, place, route, layout extraction, and timing verification. Electronic design automation (EDA) tools are often built with incremental modes of operation to facilitate this type of ECO.

One of the most common ECOs in ASIC design is the gate-level netlist ECO. In this flow, engineers manually (and often tediously) edit the gate-level netlist, instead of re-running logic synthesis. The netlist files are searched for the logic affected by the change, edited to implement the changes, and verified to ensure changes are made without introducing errors into the design. This is a very time and resource-intensive process highly subject to errors. Therefore, formal equivalence checking is normally used after ECOs to ensure the revised implementation matches the revised specification.

SUMMARY

One embodiment of the present invention is a method that includes receiving an engineering change order (ECO) that lists a name of a component in a first netlist and receiving a file linking the name of the component to a plurality of alternative names in a second netlist, where the plurality of alternative names represents components in the second netlist that are logically equivalent to the component in the first netlist. The method includes selecting one of the plurality of alternative names based on one or more criteria, updating the ECO to include the selected alternative name, and updating the second netlist based on the updated ECO.

Another embodiment of the present invention is a system that includes a computer processor and a memory containing a program that, when executed on the computer processor, performs an operation for processing data. The operation includes receiving an ECO that lists a name of a component in a first netlist and receiving a file linking the name of the component to a plurality of alternative names in a second netlist, where the plurality of alternative names represents components in the second netlist that are logically equivalent to the component in the first netlist. The operation also includes selecting one of the plurality of alternative names based on one or more criteria, updating the ECO to include the selected alternative name, and updating the second netlist based on the updated ECO.

Another embodiment of the present invention is computer program product for performing an ECO that includes a computer-readable storage medium having computer-readable program code embodied therewith. The computer-readable program code executable by one or more computer processors to receive the ECO that lists a name of a component in a first netlist and receive a file linking the name of the component to a plurality of alternative names in a second netlist, where the plurality of alternative names represents components in the second netlist that are logically equivalent to the component in the first netlist. The program code is executable to select one of the plurality of alternative names based on one or more criteria, update the ECO to include the selected alternative name, and update the second netlist based on the updated ECO.

DETAILED DESCRIPTION

Embodiments herein describe performing an engineering change order (ECO) after a physical design team has begun (or finished) a physical design (PD) netlist that defines the layout of a semiconductor chip. In one embodiment, the PD netlist is generated after a circuit design team provides a design netlist (also referred to as a "golden" or original netlist) to the PD team. The design netlist may list different logic (e.g., gates, transistors, buffers, interfaces, etc.) and the inputs/outputs of this logic which are referred to herein as nets. However, the design netlist may be placement agnostic. Stated differently, the design netlist may indicate what logic should be in the chip and how the logic is interconnected using nets, but the netlist does not indicate where in the chip the logic and nets should be located. Instead, using one or more automatic layout tools, the PD design team alters the design netlist to generate a PD netlist which is placement aware, and as such, considers physical constraints such as distance between logic, the physical dimensions of the chip, metal density requirements, and the like. As a result, the PD netlist may be very different from the design netlist.

If the design team wishes to alter the circuit design, they generate an ECO. However, the ECO may describe changes or additions to the logic and/or nets using component names found in the design netlist. However, these names may have been altered or deleted by the PD team when generating the PD netlist. Because the relationship between the components in the design netlist (e.g., the logic gates, nets, pins, etc.) and the components in the PD netlist may be unknown, typical tools used to perform ECOs may result in major changes in the PD netlist which requires a lengthy validation process to ensure the changes were correct. Instead, embodiments herein generate an equivalents nets file that links components in the design netlist to the components in the PD netlist. When performing an ECO, the PD team can use this file to map the components in the ECO (which are based on the design netlist) to all the equivalent components in the PD netlist. The PD team then selects one of the equivalent components using selection criteria (e.g., distance, congestions, timing, etc.). By linking the components in the design netlist to equivalent (i.e., alternative) components in the PD netlist, the embodiments herein may reduce the amount of changes made when performing an ECO, thereby reducing the time needed to validate the new design which reduces the delay caused by performing the ECO.

Figure 1:
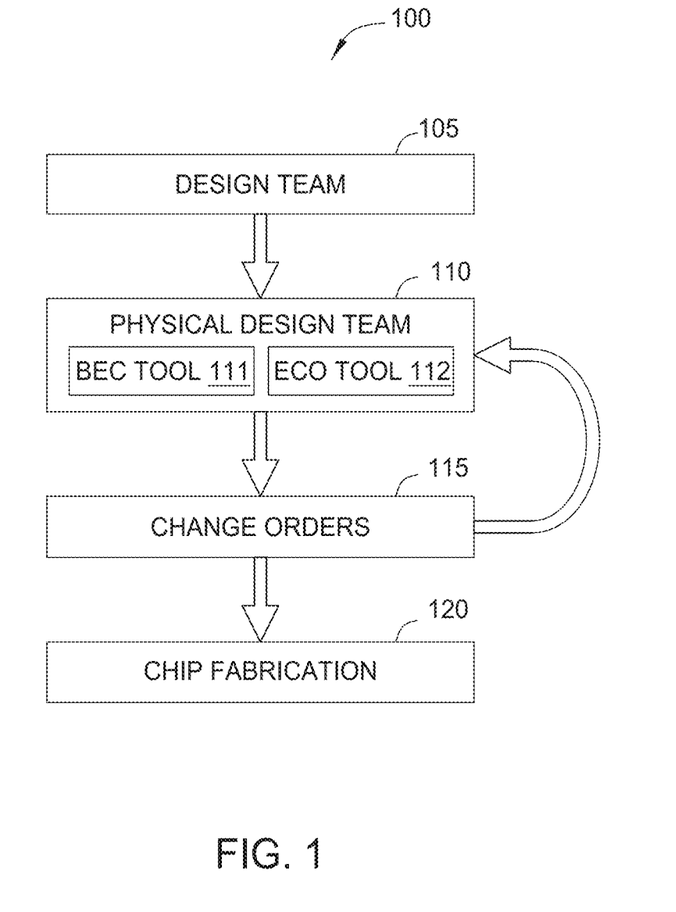
FIG. 1 is flow chart for performing a change order, according to one embodiment disclosed herein.

FIG. 1 is flow chart illustrating a method 100 for performing a change order, according to one embodiment disclosed herein. At block 105, a design team generates a design netlist that describes a circuit for a semiconductor chip. For example, the circuit may include different logic such as gates, transistors, logical units, etc. that are interconnected by nets and traces. The different logic and nets are referred to collectively herein as components in the design netlist. The design netlist may indicate, for example, that an output of a transistor or logical unit (i.e., a net) is coupled to an input of a different transistor. In this manner, the design netlist defines the functionality of the chip.

In one embodiment, the design netlist is placement agnostic and does not consider physical constraints such as timings, distance between logical units, size of the components, coupling capacitance, and the like. At block 110, the design team passes the design netlist to the PD team that generates a PD netlist that does consider the placement of the different components on the chip. Ideally, the function of the design netlist and the PD netlist is the same. That is, given the same inputs, the outputs of the two circuits should be the same. However, the PD team may have to alter the design netlist to account for the factors described above. In one example, the PD team may need to add buffers to a trace between two logical units to account for signal attenuation or noise. In another example, the PD team may need to add dummy traces to achieve a certain metal density or mitigate coupling capacitance. Thus, the PD netlist generated by the PD team that includes these new or altered components may be very different than the design netlist provided by the design team.

At block 115, the design team may submit an ECO to the PD team. For example, the design team may have found a flaw in the circuit or wish to add additional functionality. As mentioned above, the ECO may list changes to the components in the design netlist instead of the PD netlist. However, the component names may have changed when the PD team generated the PD netlist. As such, the PD team may be unable to simply change the PD netlist using the changes in the ECO. For example, the PD netlist may have divided the interconnect coupling two logical units into a plurality of different buffers because of the distance between the units. Thus, a net name used in the design netlist to connect the two logical units may be replaced by multiple different nets in the PD netlist. Without identifying this change, a software tool performing the ECO may change larger portions of the PD netlist than would otherwise be needed. Instead, the PD team may use a Boolean equivalence checker (BEC) tool 111 (which may be software, hardware, or some combination thereof) to generate an equivalents nets file used to link the component names in the design netlist to the equivalent component names in the PD netlist. This enables the PD team to identify specific locations in the PD netlist that should be changed rather than replacing large chunks of code in the PD netlist.

Method 100 returns to block 115 where the PD team uses an ECO tool 112 to perform the ECO using the equivalent nets file. For example, the ECO tool 112 may update the PD netlist to add new circuitry, re-wire the logical gates, remove circuitry, and the like. In one embodiment, the ECO tool 112 (which may be software, hardware, or some combination thereof operating in a computing system with a processor and memory) validates or checks the updated PD netlist to ensure the ECO changes did not introduce errors into the logic or functionality of the chip. Once validated, at block 120, the chip is fabricated using the PD netlist. For example, different layers or masks may be developed to form the components listed in the PD netlist. The chip is fabricated using these masks.

Figure 2:
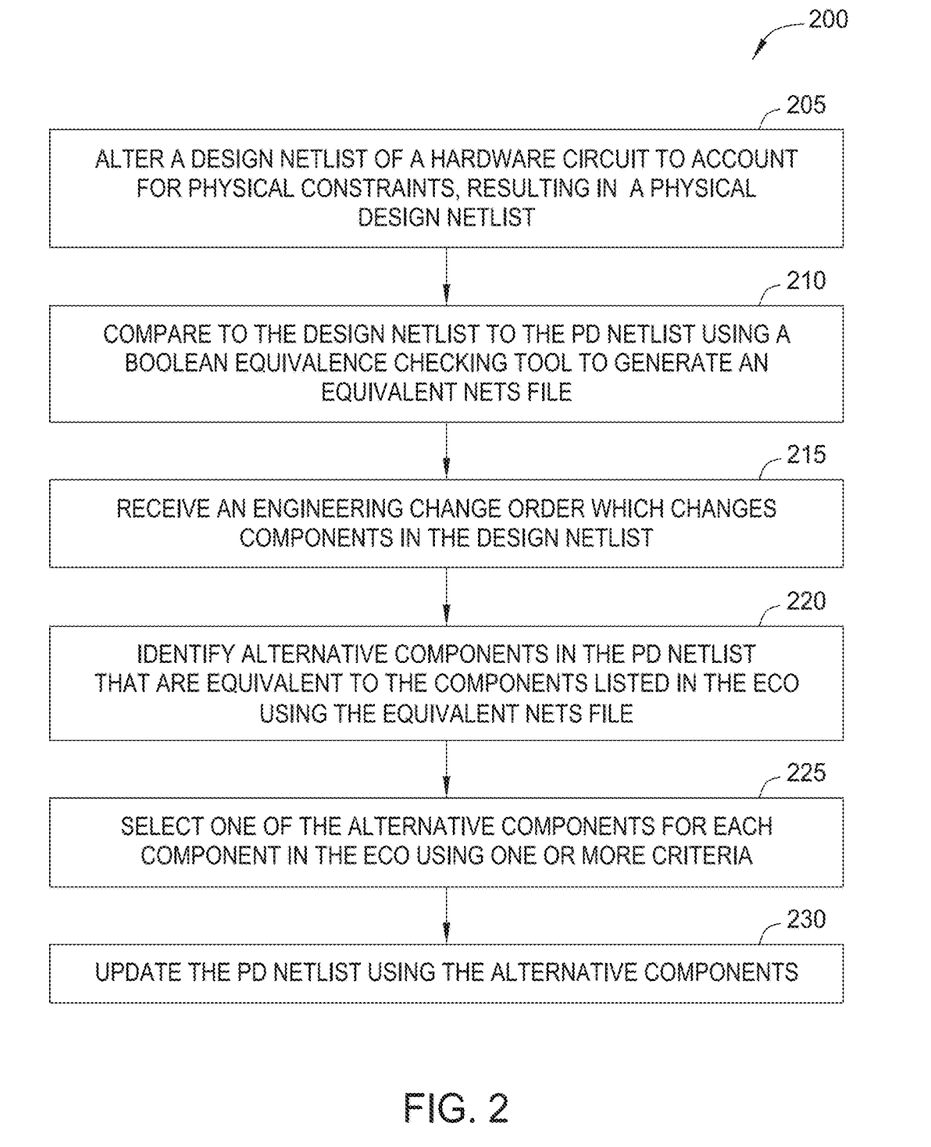
FIG. 2 is flow chart for performing a change order using a Boolean equivalence checking tool, according to one embodiment disclosed herein.

FIG. 2 is flow chart illustrating a method 200 for performing a change order using a Boolean equivalence checking tool, according to one embodiment disclosed herein. For clarity, the blocks in method 200 are discussed in tandem with the FIGS. 3-7 which correspond to different portions of the method 200. At block 205, a PD team alters a design netlist of a hardware circuit for a semiconductor chip to account for physical constraints such as timing, size constraints, capacitive coupling, noise, and the like, which results in a PD netlist. To illustrate the possible differences between the design netlist and the PD netlist, FIG. 3 illustrates logic circuit 300 defined by a design netlist while FIG. 4 illustrates a partial layout of a chip defined by a PD netlist.

Figure 3:
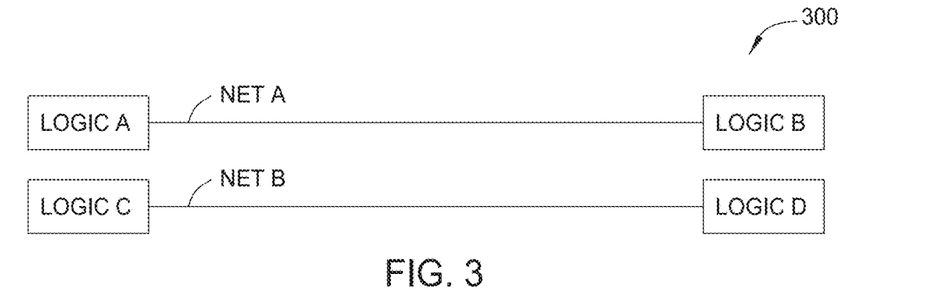
FIG. 3 is logic circuit described by a design netlist, according to one embodiment disclosed herein.

FIG. 3 includes four logical units—i.e., Logic A, B, C, and D—which are connected by Net A and Net B. The logical units may include gates, transistors, buffers, current/voltage sources, or any other circuitry which may be formed on a semiconductor chip. The nets may correspond to the different inputs or outputs of the logical unit—e.g., Net A connects the output of Logic A to the input of Logic B. However, the logic circuit 300 may be designed without considering the physical constraints of implementing the circuit 300 in a physical chip. As such, the logic circuit 300 defined by the design netlist may represent an idealized version of the circuitry.

Figure 4:
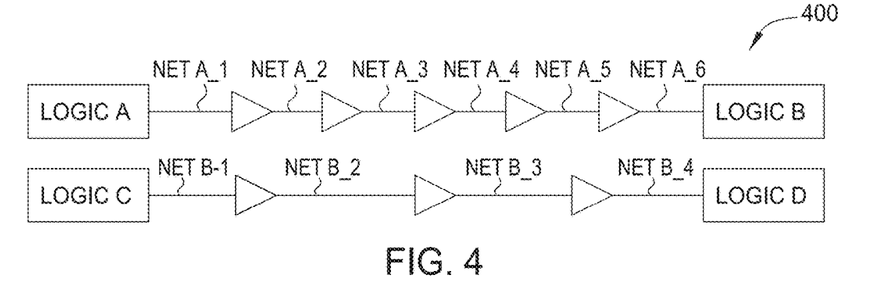
FIG. 4 is a partial layout of a chip defined by a physical design netlist, according to one embodiment disclosed herein.

FIG. 4 includes the same logical units as shown in FIG. 3 but the circuitry 400 includes changes made relative to the circuitry 300 in consideration of physical constraints. Specifically, the interconnects between Logic A and B and between Logic C and D are subdivided into different interconnects coupled to buffers. For example, the separation distance between the logical units may too great for a direct trace between the units. Instead, the circuitry 400 includes a series of buffers that reproduce the signals transmitted between the logical units.

Comparing FIG. 3 to FIG. 4, instead of Net A connecting Logic A to Logic B in the design netlist, Net A has been replaced in the PD netlist by Net A_1, Net A_2, Net A_3, and so forth. Similarly, instead of having a net named Net B, the PD netlist includes Net B_1, Net B_2, Net B_3, and Net B_4. Thus, Nets A and B in the design netlist have been replaced in the PD netlist to include the multiple nets illustrated in FIG. 4, and as such, the net names listed in the design netlist do not match the net names listed in the PD netlist. Moreover, additional circuitry (i.e., the buffers) is added to the PD netlist which was not included in the design netlist. Although FIGS. 3 and 4 illustrate subdividing an interconnect into plurality of interconnects and buffers, this is just one example of a change between a design netlist and PD netlist. Other examples may include adding new dummy wires, power sources, clock drivers, and the like.

Returning to method 200, at block 210, the PD team compares the design netlist to the PD netlist using a BEC tool to generate an equivalent nets list. Although the design netlist is changed to account for the physical constraints of implementing a circuit in a physical chip, nonetheless, the functionality of the circuits defined by the design and PD netlists should be the same. As such, in many cases, the components listed in the design netlists will have at least one (if not multiple) alternative components in the PD netlist. Using FIGS. 3 and 4 as examples, the signal corresponding to Net B in circuit 300 is the logical equivalent to the signals corresponding to Nets B_1, B_2, B_3, and B_4 in circuit 400. That is, as the signal propagates between Logic A and Logic B, the buffers do not change the logical value of the signal (e.g., whether a digital signal is a logical one or zero) but merely amplifies or reshapes the signal to prevent attenuation or noise from degrading the signal to a point where it can no longer be received by Logic B. The BEC tool is able to identify these logically equivalent components by comparing the design and PD netlists.

Figure 5:
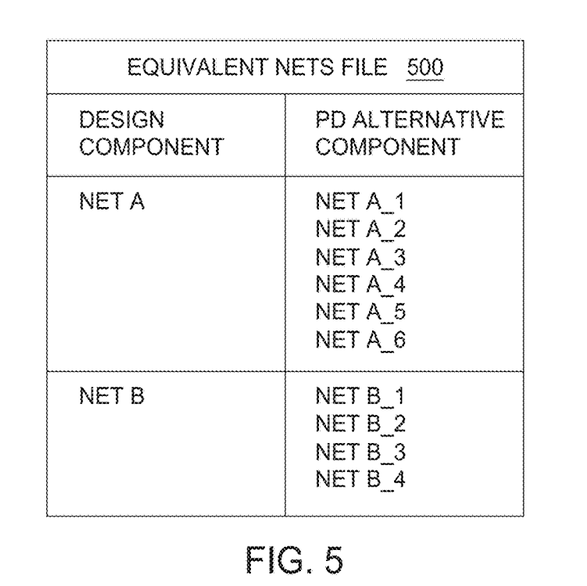
FIG. 5 is an equivalent nets file generated by comparing the design netlist to the physical design netlist, according to one embodiment disclosed herein.

FIG. 5 illustrates an equivalent nets file 500 generated by comparing the design netlist corresponding to FIG. 3 to the PD netlist corresponding to FIG. 4, according to one embodiment disclosed herein. The left column of file 500 illustrates components in the design netlist (which are nets in this example), while the right column illustrates alternative components in the PD netlist that are equivalent to the component in the left column. Here, Net A in the design netlist is equivalent to Nets A_1, A_2, A_3, and so forth, in the PD netlist while Net B is equivalent to Nets B_1, B_2, B_3, and B_4 in the PD netlist. Stated differently, although the PD netlist added buffers to divide up the interconnects between the logical units, the outputs of these buffers (e.g., Nets A_1, A_2, B_1, B_2 etc.) are logical equivalent to Nets A and B.

Returning to method 200, at block 215, the PD team receives an ECO which changes components in the design netlist. Put differently, the ECO alters or adds one or more nets, pins, or logical circuitry in the design netlist. However, because the ECO may list changes that include component names that correspond to the design netlist, these names may have been altered or removed from the PD netlist. Thus, it may not be readily apparent how changes listed in the ECO should alter the PD netlist.

At block 220, an ECO tool identifies alternative components in the PD netlist that are listed in the ECO using the equivalent nets file. Again using FIG. 5 as an example, if Net A is listed in the ECO, the ECO tool identifies that Net A_1, Net A_2, and so forth are its logical equivalents.

Figure 6:
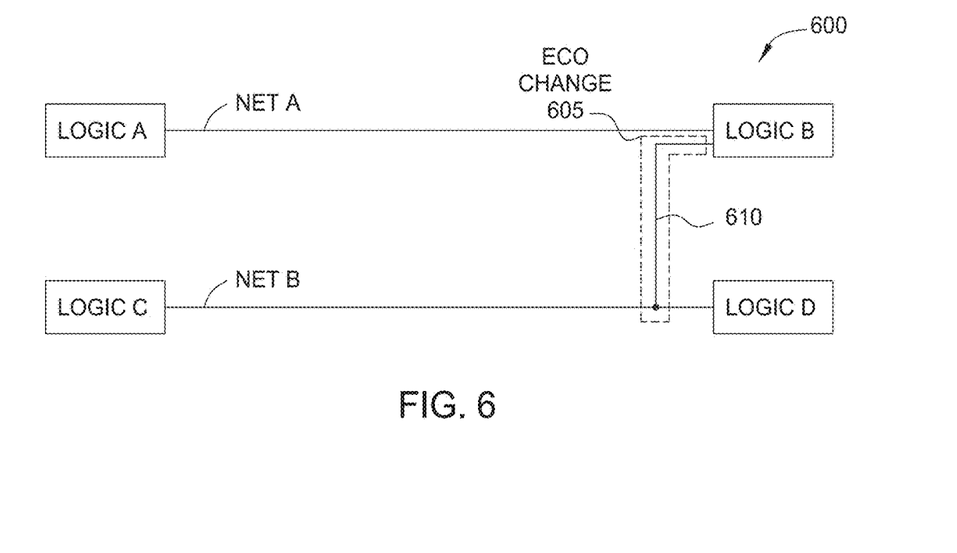
FIG. 6 is a logic circuit changed by an engineering change order, according to one embodiment disclosed herein.
Figure 7:
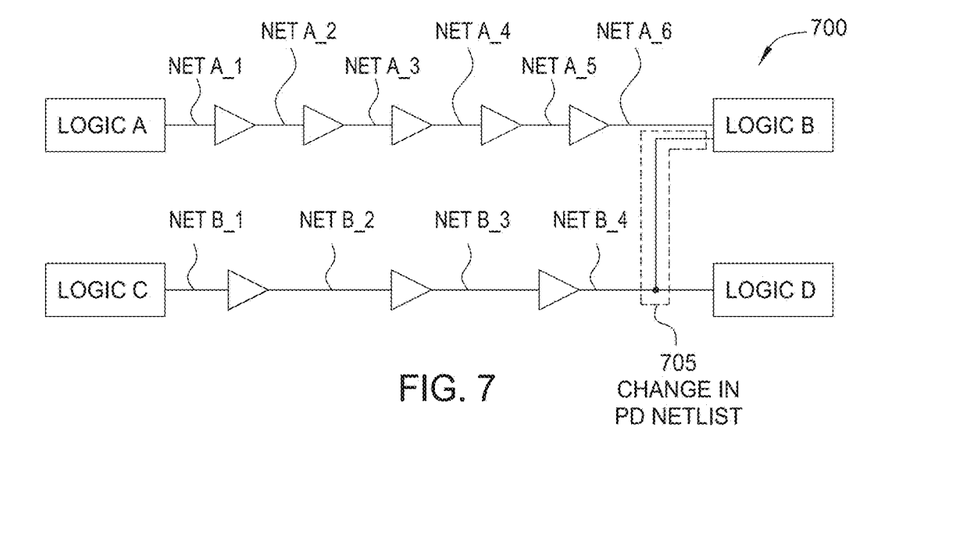
FIG. 7 is a partial layout of a chip changed by the ECO, according to one embodiment disclosed herein.

At block 225, the ECO tool selects one of the alternative components for each component in the ECO using one or more criteria. For example, FIG. 6 illustrate a logic circuit 600 changed by an ECO. Specifically, the ECO includes an ECO change 605 where Net B (i.e., the output of Logic C) is used as an input into Logic B. That is, the ECO may include code indicating that Net B should now connect to the input of Logic B. However, as discussed above, the net names used in the ECO change 605 may not match the new net names in the PD netlist. For example, FIG. 7 illustrates a partial layout 700 of a chip where the nets have been changed relative to the nets in FIG. 6. In layout 700, Net B is equivalent to Nets B_1, B_2, B_3, and B_4.

In one embodiment, the ECO tool may use distance as a criteria to select one of the equivalent nets. For example, Logic B is closest to Net B_4, thus, in FIG. 7, a change in the PD netlist 705 is made between Net B_4 (i.e., the output of the rightmost buffer) and Logic B. Thus, the change stipulated in the ECO that Net B now be used as an input to Logic B is changed by the ECO tool to indicate that the Net B_4 is coupled to the Logic B, thereby generating an updated ECO.

Additionally or alternatively, the ECO tool considers congestion, available routing paths between logic modules in the chip, signal strength, cost, and the like as criteria for selecting one of the alternative components in the PD netlist. As discussed below, the ECO tool may assign a score to the alternative components based on a combination of the criteria mentioned above and select the component with the highest score. Again using FIG. 7 as an example, if Logic B was located near the middle of the interconnect extending between Logic C and Logic D instead of at the end, then Net B_2 or Net B_3 may have the highest score and be selected rather than Net B_4 as shown here.

At block 230, the ECO tool updates the PD netlist using the alternative components. In the example shown in FIGS. 6 and 7, Net B is replaced by Net B_4 in the ECO. The ECO tool may then perform the ECO using the alternative components. Although not shown in method 200, once the PD netlist is updated, a validation process may be performed to ensure the ECO did not introduce any errors into the chip design.

Figure 8:
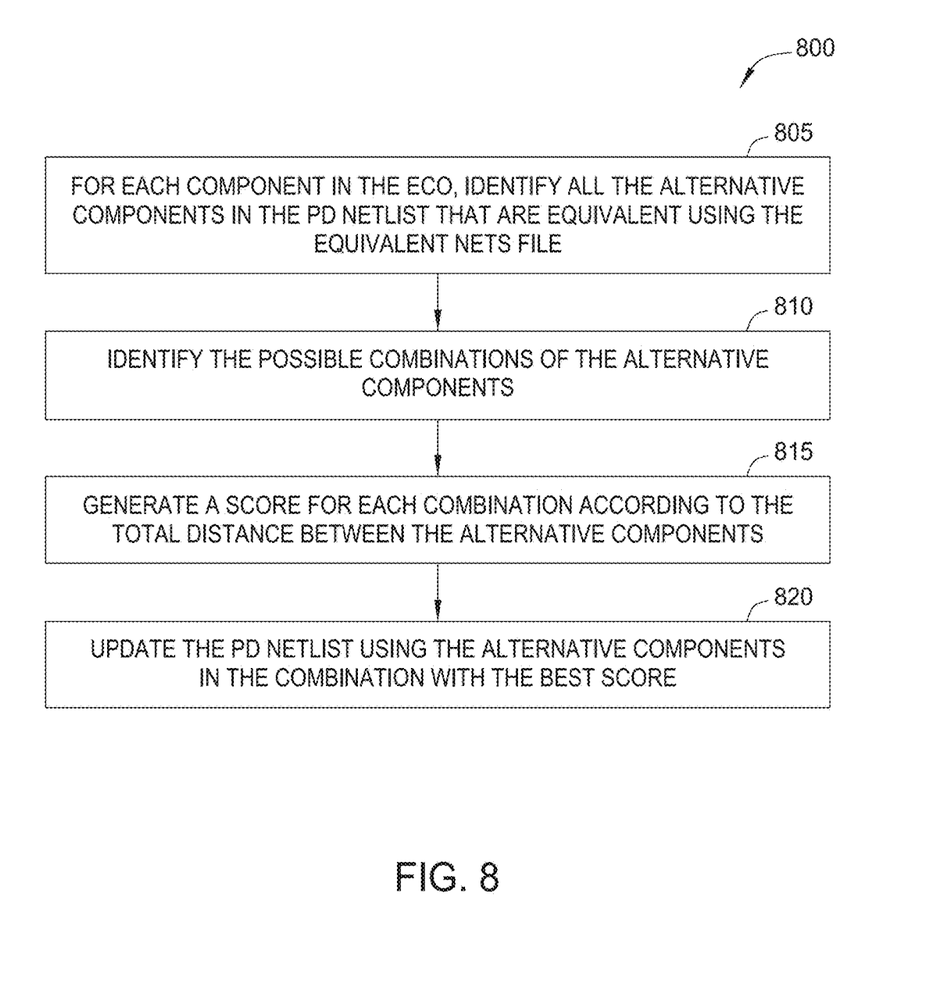
FIG. 8 is a flow chart of selecting components in the physical design netlist to satisfy an ECO, according to one embodiment disclosed herein.

FIG. 8 is a flow chart of a method 800 for selecting components in the physical design netlist to satisfy an ECO, according to one embodiment disclosed herein. In one embodiment, method 800 assumes that the blocks 205-215 of method 200 have already been performed. At block 805, for each component in the ECO (e.g., nets and/or logic units), the ECO tool identifies all the alternative components in the PD netlist that are equivalent using the equivalent nets file. Using FIGS. 9 and 10 as an example, Net A and Net B in FIG. 9 have been subdivided into Nets A_1, A_2, A_3, B_1, B_2, and B_3 in FIG. 10. Specifically, Net A is logically equivalent to Nets A_1, A_2, and A_3 and Net B is logically equivalent to Nets B_1, B_2, and B_3.

Figure 9:
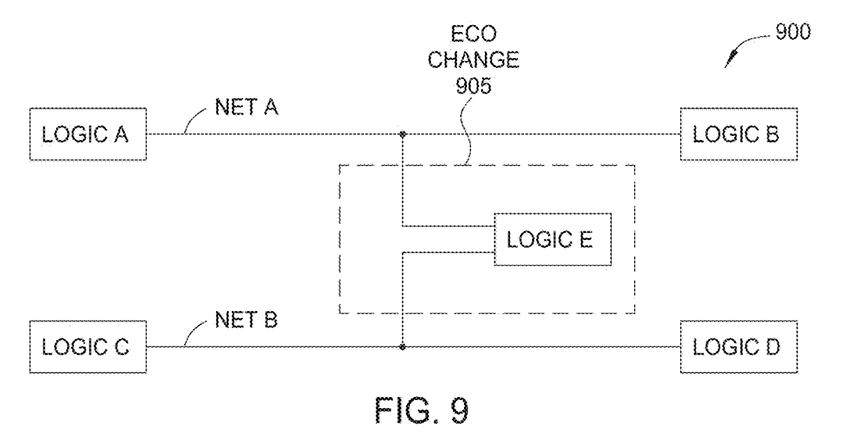
FIG. 9 is a logic circuit changed by the ECO, according to one embodiment disclosed herein.

At block 810, the ECO tool identifies the possible combinations of the alternative components that could be used to perform the ECO tool. For example, the logic circuit 900 in FIG. 9 illustrates an ECO change 905 where Net A and Net B are used as inputs to Logic E, which is being added to the circuit 900. Put differently, the ECO change 905 stipulates that the outputs of Logic A and Logic C should be used as the inputs for Logic E.

Figure 10:
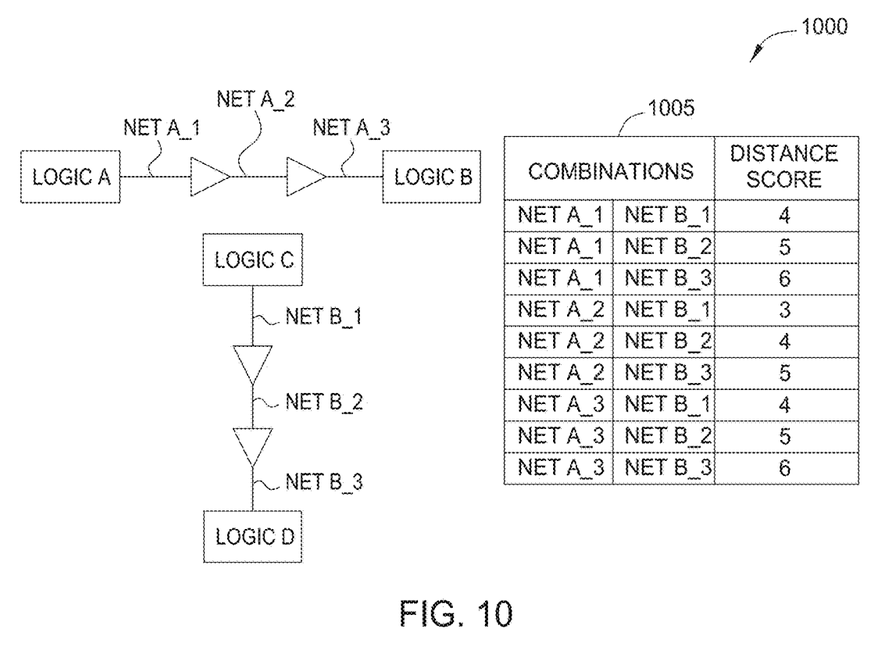
FIG. 10 is a partial layout of a chip defined by a physical design netlist, according to one embodiment disclosed herein.

Graph 1005 illustrates the different combinations of the alternative components for Net A and Net B. For example, row 1 illustrates that Net A_1 and Net B_1 could be used as the inputs to Logic E, row 2 illustrates that Net A_1, and Net B_2 could be used as inputs to Logic E, and so forth. Because the nets in FIG. 10 are logically equivalent to the nets in FIG. 9, any of the combinations shown in graph 1005 could be used and the results should be the same. Unlike the ECO change 605 in FIG. 6, in FIG. 9, the ECO change 905 includes altering two nets instead of one. As such, the different possible combinations of the alternative nets in the PD netlist are considered in order to select which combination should be used. While FIGS. 9 and 10 illustrate an ECO change 905 that alters two nets, method 800 may also be applied for changing more than two nets or components in design netlist.

At block 815, the ECO tool generates a score for each combination of the nets according to the total distance between the alternative components. Referring to FIG. 10, the physical layout 1000 results in components being closer to some components than others. For example, Nets A_1 is closer to Net B_1 than to Net B_2 and Net B_3. Generally, it is preferable to use the nets that are closest to the circuitry coupled to the nets.

If the circuitry indicated in the ECO is already in the PD netlist, the location of the circuitry can be used to calculate distance scores for the different net combinations listed in graph 1005. Using FIG. 10 as example, if the ECO indicated that Net B should be connected to the input pin of Logic B, the ECO tool calculates the distance for each of the alternative nets for Net B to the location of Logic B in the layout 1000. In this example, Net B_1 would be the closest to Logic B, and thus, would be coupled to Logic B as instructed by the ECO.

However, the ECO change 905 illustrated in FIG. 9 indicates that Net A and B should couple to the input of Logic E which is being added to the circuit 900. As such, Logic E does not yet have a location in the layout 1000. To calculate the distance scores for the different net combinations, the ECO tool may assume the location of the circuitry to be added is in the center of the alternative nets—i.e., the centroid of Nets A_1, B_1, A_2, B_2, etc.

Figure 11:
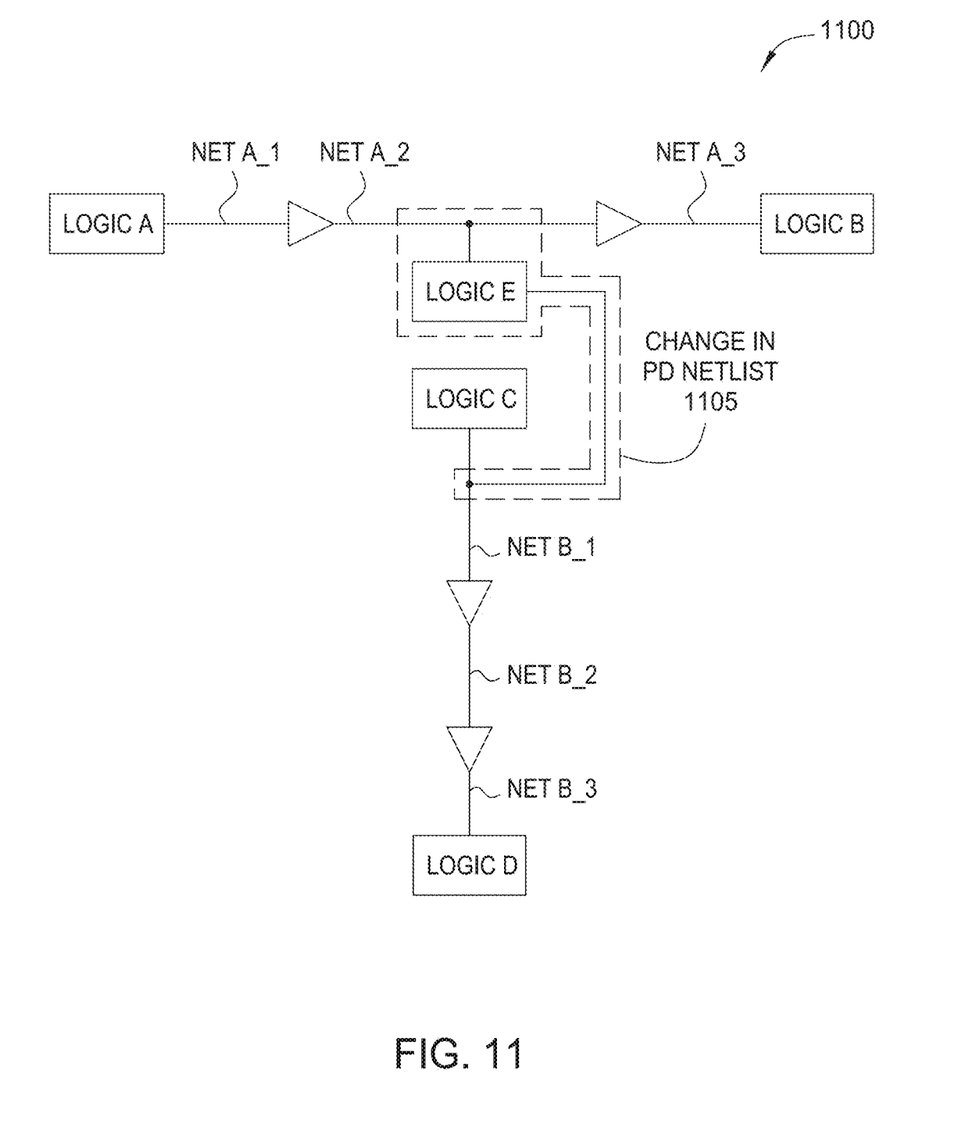
FIG. 11 is the partial layout of FIG. 10 that is changed by the ECO, according to one embodiment disclosed herein.

FIG. 11 illustrates a design layout 1100 where Logic E is placed in the approximate center of the alternative nets for Nets A and B. Once placed, the ECO tool calculates the distance from Logic E to each of the alternative nets and sums the distances to identify the total distance between the added logic and the nets. This total distance is (or can be modified to derive) the distance scores shown in graph 1005 of FIG. 10. The distance scores generally represent the routing distance required to complete the ECO and couple Net A and B to the Logic E.

In graph 1005, the distance scores for each of the net combinations are shown in the rightmost column. Here, the net combination that is the closest to Logic E (i.e., the combination that results in the smallest router distance) is the combination of Net A_2 and Net B_1 as indicated by its distance score. Although this embodiment uses distance to calculate the score, other criteria may also be considered in addition to, or alternatively of distance such as congestion, available routing paths between logic modules in the chip, signal strength, cost, and the like. For example, if the two combinations both have the lowest distance score, then congestion or available routing paths may be used to break the tie.

In other embodiments, instead of (or in addition to) using the centroid between nets to determine the location of the new circuitry to be added by the ECO, the ECO tool may determine the location using factors such as congestion or the impact on other circuits. For example, the centroid may be too congested to fit the new circuitry, or adding the new circuitry may cause problems such as crosstalk or introduce noise. Thus, these factors may be considered when determining the location for the new circuitry.

Returning to method 800, at block 820, the ECO tool updates the PD netlist using the alternative components in the combination with the best score. For example, the ECO tool may update the originally received ECO to include the alternative components with the best score. That is, where the original ECO listed Net A and Net B, these net names are replaced by Net A_2 and Net B_1, respectively, in the ECO. This new ECO may be used to update the PD netlist, thereby changing the layout of the chip. As shown by the ECO change 1105 in FIG. 11, Logic E is added to the center location between the alternative nets for Net A and Net B. Specifically, the ECO tool couples the inputs of Logic E to the alternative nets with the best distance score—i.e., the combination of Net A_2 and Net B_1. Doing so minimizes the routing distance used to perform the ECO. Moreover, using the criteria discussed above reduces the impact of the changes in the ECO on the other circuitry in the design layout.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the BEC or ECO tools) or related data available in the cloud. For example, the ECO tool could execute on a computing system in the cloud and receive the change orders from the user, generate updated orders using the equivalents file, and provide an update PD netlist. In such a case, the ECO tool could generate and store the net equivalents file and the original PD netlist at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving an engineering change order (ECO) that lists a name of a component in a first netlist;
   receiving a file linking the name of the component to a plurality of alternative names in a second netlist, wherein the plurality of alternative names represents components in the second netlist that are logically equivalent to the component in the first netlist;
   selecting one of the plurality of alternative names based on one or more criteria by calculating a score for each of the plurality of alternative names based on distances between the components represented by the plurality of alternative names and a circuit listed in the ECO, wherein the selected alternative name represents the component closest to the circuit;
   updating the ECO to include the selected alternative name;
   updating the second netlist based on the updated ECO; and
   controlling a fabrication of a semiconductor chip using the updated second netlist.

2. The method of claim 1, wherein the first and second netlists correspond to a design of the same semiconductor chip, wherein the first netlist differs from the second netlist in that the second netlist is generated by considering physical constraints of the semiconductor chip that were not considered when generating the first netlist.

3. The method of claim 2, wherein the name of the component in the first netlist represents a net that is subdivided into a plurality of nets in the second netlist that each correspond to one of the plurality of alternative names.

4. The method of claim 2, further comprising:
   comparing the first netlist to the second netlist using a Boolean equivalence checker (BEC) tool to generate the file.

5. A method comprising:
   receiving an engineering change order (ECO) that lists a first name of a first component in a first netlist and a second name of a second component in the first netlist;
   receiving a file linking the first name of the first component in the first netlist to a first plurality of alternative names in a second netlist and the second name of the second component in the first netlist to a second plurality of alternative names in the second netlist, wherein the first plurality of alternative names represents components in the second netlist that are logically equivalent to the first component in the first netlist;
   generating a plurality of combinations by combining one of the first plurality of alternative names with one of the second plurality of alternative names;
   generating, for each of the plurality of combinations, a score based on a total distance between the components represented by the first and second alternative names in the combination and a circuit listed in the ECO;
   selecting one of the plurality of combinations based on the scores;
   updating the ECO to include the selected combination;
   updating the second netlist based on the updated ECO; and
   controlling a fabrication of a semiconductor chip using the updated second netlist.

6. The method of claim 5, wherein the plurality of combinations represent all possible combinations of the first plurality of alternative names with the second plurality of alternative names.

* * * * *